United States Patent [19]

Bluestein

[11] 4,267,298
[45] May 12, 1981

[54] PROCESS FOR PREPARING M-STOPPED SILICONE FLUIDS FROM SILANOL FLUIDS

[75] Inventor: Ben A. Bluestein, Schenectady, N.Y.

[73] Assignee: General Electric Company, Waterford, N.Y.

[21] Appl. No.: 92,920

[22] Filed: Nov. 9, 1979

[51] Int. Cl.³ ............................................. C08G 77/04
[52] U.S. Cl. .................................. 528/34; 525/477; 525/478; 556/467; 528/42
[58] Field of Search .................... 528/34, 42; 556/467; 525/477, 478

[56] References Cited

U.S. PATENT DOCUMENTS

| | | | |
|---|---|---|---|
| 2,961,425 | 11/1960 | Pierce et al. | 260/46.5 |
| 2,979,519 | 4/1961 | Pierce et al. | 260/448.2 |
| 3,002,951 | 10/1961 | Johannson | 260/46.5 |
| 3,006,878 | 10/1961 | Talcott | 260/29.1 |
| 3,179,619 | 4/1965 | Brown | 260/37 |
| 3,377,284 | 4/1968 | Schiefer et al. | 252/49.6 |
| 3,386,945 | 6/1968 | Bartell et al. | 260/37 |
| 3,607,899 | 9/1971 | Brown | 260/448.2 |
| 3,630,982 | 12/1971 | Matherly | 260/29.1 |

FOREIGN PATENT DOCUMENTS

| | | |
|---|---|---|
| 1189170 | 3/1965 | Fed. Rep. of Germany . |
| 899659 | 6/1962 | United Kingdom . |
| 899661 | 6/1962 | United Kingdom . |

OTHER PUBLICATIONS

Eaborn, Organosilicon Compounds, Butterworths Scientific Publications, London, pp. 264–269, 1960.

Primary Examiner—Melvyn I. Marquis
Attorney, Agent, or Firm—E. Philip Koltos; J. L. Young; Philip L. Schlamp

[57] ABSTRACT

A method for producing triorganosilyl-end stopped diorganopolysiloxane fluids having a viscosity varying from 50 to 2,000,000 centipoise at 25° C. comprising reacting a silanol end-stopped fluoro substituted polymer with a halogenated silane in the absence of base such that the silanol groups at the ends of the polymer are substituted by triorganosilyl groups. The advantage of the above process is that a high yield of the desired fluid is obtained.

18 Claims, No Drawings

PROCESS FOR PREPARING M-STOPPED SILICONE FLUIDS FROM SILANOL FLUIDS

BACKGROUND OF THE INVENTION

The present invention relates to a process for producing fluorosilicone polymers and more particularly the present invention relates to a process for producing triorganosilyl end-stopped diorganopolysiloxane fluids in high yield.

Fluorosilicone polymers are well-known. Fluorosilicone polymers, while not the most common of silicone polymers, are recognized in the art. The advantage of such fluorosilicone polymers is that they can resist certain solvents much more effectively than ordinary silicone polymers. These polymers have this effective resistance to hydrocarbon solvents due to the presence of a 3,3,3 trifluoropropyl group in the polymer chain. Accordingly, such polymers, while expensive to make, find ready use as electrical connectors and the like in places where the connector will come in contact with the solvent. Such fluorosilicone polymers, in the case of heat vulcanizable silicone rubber compositions, are produced by taking trifluoropropene and reacting it with a hydrogensilane so as to produce methyl 3,3,3-trifluoropropyldichlorodisilane. The dichlorosilane is then hydrolyzed in water and the hydrolysate is cracked in the presence of an alkali metal hydroxide and other indgredients to preferentially distill overhead a cyclotrisiloxane. The cyclotrisiloxane is then taken and then in the presence of minor amounts of alkali metal hydroxide catalysts or alkali metal catalysts of various kinds, the cyclo trisiloxane is polymerized very rapidly in almost 100 percent yield to a linear diorganopolysiloxane gum having a viscosity of anywhere from 500,000 to 300,000,000 centipoise at 25° C., where the organo substituting groups in the polymer are methyl and 3,3,3 trifluoropropyl. Co-polymers may be produced to a certain extent by equilibration of dimethylcyclotrisiloxanes with the fluoropropyl cyclotrisiloxanes. It should be noted that recently there has been some work carried out by the General Electric Company in the polymerization of fluorosilicone substituted cyclotetrasiloxane. Such fluorosilicone cyclotetrasiloxanes are polymerized to some extent to form linear diorgranopolysiloxane gums of the desired viscosity but the yield is not as high as with the cyclotrisiloxane.

Accordingly, for the production of gums, the fluorosilicone substituted cyclotrisiloxanes are preferred. The gums may then be taken and there may be incorporated into them the desired amounts of filler treated or untreated; and process aids, preferably vinyl containing silicone process aids. Then there is added to the composition a peroxide catalyst such that it can cure to a silicone elastomer at elevated temperatures that is temperaures about 100° C. Examples of fluorosilicone technology are to be found in the following U.S. Pat Nos. 2,979,519; 3,179,619; 3,006,878; 3,002,951; 3,630,982; 3,377,284; 2,961,425; and 3,386,945.

It is found that when such gums were produced that the chain-stoppers did not participate sufficiently in the polymerization. Alternatively, in the production of dimethyl polysiloxane gums that is polymer having a viscosity from 500,000 to 300,000,000 centipoise at 25° C., the presence of trimethylsiloxane end-stopped low molecular weight polymers as chain-stoppers controls and final molecular weight of the composition. However, with respect to fluorosilicone polymers when it is attempted to form a gum, the polymer will rapidly polymerize to a high molecular weight polymer. However, with the use of chain-stoppers in such reaction, it was found that the traditional chain-stoppers would react into the composition only very slowly. Accordingly, if it was desired to obtain gums with triogranosiloxy end-stopped groups, the chain-stoppers would react so slowly into the gum that the gum would degrade to form cyclics such that after a period of time passed for all of the chain-stoppers to react into the gum there would result a relatively low yield gum with the siloxy end-stopped units since the rest of gum would have reverted to cyclic material. Accordingly, it was desired to produce or have an effective chain-stopper for the production of fluorosilicone substituted diorganopolysiloxane gums in which the chain-stopper will react rapidly into the gum that was formed. Accordingly, as a result of this problem, there evolved the use or the development of the use of silanol-end stopped siloxane as a chainstopper in the production of fluorosilicone polysiloxane gums. This work is disclosed in a patent application of Ben A. Bluestein et al filed Nov. 13, 1978, entitled "Process for Producing Fluorosilicone Polymers", Ser. No. 959,544. The above docket also indicates that high molecular weight alcohols can also be utilized as chain-stoppers in a production of fluoropropyl polysiloxane gums. It was found that such silanol end-stopped fluoropropyl substituted polysiloxane gums would function effectively to produce a fluorosilicone substituted heat curable composition which can cure to a silicone elastomer which silicone elastomer had desired solvent resistant properties.

Proceeding to a slightly different branch of fluorosilicone chemistry, it was indicated by the prior art that also by similiar methods as the above dimethyl polysiloxane fluids are formed (by fluids it is meant a linear diorganopolysiloxane polymer having a viscosity of 50 to 50,000 centipoise at 25° C.) and that such fluids could be formed by the reaction of cyclotri or tetra siloxanes with low molecular weight triorganopolysiloxane chain-stoppers in the presence of strong acid catalyst. Accordingly, in dimethyl silicone polymer chemistry it is well known to react cyclotetrasiloxanes with low molecular weight triorgansiloxy end-stopped chain-stoppers such as disiloxanes for instance, hexamethyldisiloxane in the presence of toluene sulfonic acid or acid treated clay to produce the desired fluid. It should be noted here that such fluids are desired for instance to produce silicone greases, silicone hydraulic fluids, silicone anti-foam compositions, silicone paper release compositions, etc. Accordingly, the prior art indicated that when it was desired to produce a fluorosilicone fluid that such a fluorosilicone fluid could be produced by the equilibration or reaction of fluorosilicone cyclotrisiloxane in the presence of acids to form the desired fluid in much the same way that the dimethyl fluids were formed, the only difference being there was utilized a cyclotrisiloxane instead of a cyclotetrasiloxane. Examples of such art which was related to the production of fluorosilicone fluids which were polymers and copolymers are to be found in Brown et al, U.S. Pat. No. 3,607,899, U.K. Pat. No. 899,659 Pending Group 170. Pierce et al U.S. Pat. No. 2,961,425, Currie et al German Pat. No. 1,189,170, U.K. Pat. No. 899,661, and the Publication C. Eaborn, "Organosilicon Compounds," published by London, Butterworths and Company. The only difficulty with such equilibration reactions as those indicated in the foregoing publications and patents is that the hexamethyldisiloxane and other low molecular weight triorgano siloxy chain-stoppers would equilibrate into the fluid that was formed only slowly. As a result, there would be formed a large amount of cyclics, since most of the cyclopolysiloxanes react immediately or in less than a half hour to form the linear polymer and then some of it degrades to form cyclics. Accordingly, it was difficult to obtain a yield of ninety percent or more of the desired fluid utilizing this procedure; such yield being determined on the basis of the initial cyclotrisiloxane. Accordingly, it was highly desireable to find the means for increasing the yield of fluorosilicone polymer and copolymer fluids produced from a fluorosilicone cyclotrisiloxane.

Accordingly, it is one object of the present invention to provide for a process for producing high yields of fluorosilicone substituted fluids from fluoro substituted cyclotrisiloxanes.

It is another object of the present invention to provide a process or method for producing high yields of fluorosilicone polymers and copolymers from fluorosilicone substituted cyclotrisiloxanes.

It is yet an additional object of the present invention to have an efficient and economical process for producing fluorosilicone polymer fluids and copolymer fluids from fluorosilicone substituted cyclotrisiloxanes. These and other objects of the present invention are accomplished by means of the disclosure as set forth herein below.

SUMMARY OF THE INVENTION

In accordance with the above objects, there is provided by the present invention a method for producing a triorganosilane end-stopped diorganopolysiloxane fluid in high yield comprising reacting a polymer of the formula,

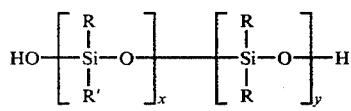
(1)

with a chain terminating silane of the formula, $$R_3^2SiX \qquad (2)$$

in the absence of a base, where R is a monovalent hydrocarbon radical of 1 to 8 carbon atoms, R' is a fluoroalkyl radical of 3 to 8 carbon atoms, and $R^2$ is a monovalent hydrocarbon radical of 1 to 8 carbon atoms and X is halogen, preferably chlorine, where x is a positive number and y is 0 or a positive number such that the viscosity of said polysiloxane varies from 50 to 2,000,000 centipoise at 25° C.

The polymer of formula (1) is produced by taking the fluoro-substituted cyclic trisiloxane and polymerizing or reacting with itself and other cyclotrisiloxanes in the presence of some amounts of KOH and utilizing water or small amounts of silanol end-stopped siloxane of silane as a chain-stopper. By utilizing such a process, a high yield fluorosilicone polymer may be produced having triorganosiloxy end-stopping units, and preferably trimethylsiloxy end-stopping units from the corresponding silanol end-stopped polymer and triorganochlorosilane.

DESCRIPTION OF PREFERRED EMBODIMENT

In the process of the present case, the silanol end-stopped fluorosilicone polymer of Formula (1) is prepared by a process that will be outlined below. However, it should be noted that the polymer can be either a homopolymer or copolymer. In any case, when it is either a homopolymer or copolymer, it must have fluoro substituted groups in it. Accordingly, generally, R' is fluoro alkyl radical of 3 to 8 carbon atoms, more preferably in Formula (1), R' is 3,3,3-trifluoropropyl. The radical R can be any monovalent hydrocarbon radical of 1 to 8 carbon atoms, such as alkyl radical of 1 to 8 carbon atoms, such as methyl ethyl propyl; alkenyl radicals such as vinyl alkyl etc. of 2 to 8 carbon atoms; mononuclear aryl radicals such as phenyl, methyl phenyl, ethyl phenyl and so forth; and cycloalkyl radicals such as cyclohexyl, cycloheptyl, etc. Most preferably R is selected from alkyl radicals of 1 to 8 carbon atoms, such as methyl and from vinyl or phenyl radicals. In the silanol end-stopped diorganopolysiloxane polymer of Formula (1) all the R radicals may be the same or different. In addition, x is a positive number and y is equal to 0 or to positive number, such that the polymer has a viscosity varying from 50 to 2,000,000 centipoise at 25° C. It should be noted that when y is equal to 0 the polymer is a homopolymer and when y is equal to a positive number, the polymer is a copolymer. In the same way in the compound of Formula (2), $R^2$ is a monovalent hydrocarbon radical of 1 to 8 carbon atoms which can be a monovalent hydrocarbon radical such as an alkyl radicals of 1 to 8 carbon atoms, alkenyl radical of 2 to 8 carbon atoms; cycloalkyl radical of 4 to 8 carbon atoms, a mononuclear aryl radical of 6 to 8 carbon atoms. Finally, the $R^2$ radical can be also a fluoroalkyl radical of 3 to 8 carbon atoms. Most preferably, the $R^2$ radical is selected from alkyl radicals of 1 to 8 carbon atoms, such as methyl, phenyl radicals, vinyl radicals, and 3,3,3-trifluoropropyl radicals. It should be noted that all three of the $R^2$ radicals may be the same or different. It also should be noted that the x is preferably chlorine. Examples of preferred silanes which may be utilized in the process of the instant case are trimethylchlorosilane, vinyldimethylchlorosilane, 3,3,3 trifluoropropyl dimethylchlorosilane, phenyldimethylchlorosilane. It should also be noted that in accordance with the above, $R^2$ may also be hydrogen. However, all the $R^2$ groups cannot be hydrogen, only one of the $R^2$ groups can be hydrogen. Accordingly, the $R^2$ group can be any monovalent group which it is desired to have in the polymer, which is the end product of the present process. Accordingly $R^2$ can be any monovalent hydrocarbon radical which it is desired to have in the chain terminated unit of the desired end-product of the instant case.

The process for producing the chlorosilanes is well known. Such silanes are well known compounds in the art, there are generally produced by the reaction of methyl chloride with silicon metal in the presence of a catalyst which can be copper. The process for producing the silanol end-stopped polymer of Formula (1) is novel. In the case of fluorosilicone polymers, the preferred process has just been recently developed. Accordingly, this process will be described for the production of silanol end-stopped fluorosilicone polymers of Formula 1. Generally such a process comprises taking trifluoropropene and reacting it with a dichlorohydrogensilane in the presence of certain catalysts. As a result of this reaction there is formed a methyltrifluoropropyldichlorosilane. The corresponding dichlorosilane is then taken and hydrolyzed in water in which the hydrolysis product that is formed is a mixture of low molecular weight linear silanol end-stopped diorganopolysiloxane polymers and also cyclopolysiloxane polymers. In such a process it is desired to obtain the cyclotrisiloxane in a maximum yield for the reasons that will be explained above. Accordingly, in such a process the hydrolyzate is taken and there is added to it 1-10% of by weight an alkali metal hydroxide which is preferably KOH. There may also be added a stabilizing additive which is a high molecular weight alcohol as disclosed in U.S. Pat. No. 4,111,973. After adding the catalyst, vacuum is applied and the temperature of the reaction mixture is raised above 100° C. for a period of time varying from 2 to 24 hours and there is preferably distilled overhead the methyltrifluoropropylcyclotrisiloxane. It should be noted from this process there are produced many cyclo siloxanes. However, the cyclotrisiloxane is distilled overhead and by choosing the reflux temperature of the reacting mixture there is basically distilled overhead only the cyclotrisiloxane which is removed from the process mixture and in accordance with this process there is formed a maximum of cyclotrisiloxane from the reaction hydrolysis mixture. The cyclotrisiloxane is then taken and if it is desired to produce a polymer there is added from 10 to 100 parts per million of alkali metal hydroxide catalyst and silanol end-stopped silicone compound. The preferred alkali metal hydroxide catalyst is potassium hydroxide; however, it is understood that other alkali metal hydroxide catalysts may be utilized such as sodium hydroxide, cesium hydroxide and complexes of these alkali metal hydroxide catalysts. A process for forming gum polymers is disclosed in patent application Ser. No. 959,544, aband. A silanol end-stopped fluid is formed by reacting in the presence of alkali metal hydroxide catalyst, the fluorosilicone trimer with the desired quantity of water as the chain-stopper. In the most preferred process of the instant case, water is utilized in the desired quantities as a chainstopper in the reaction media. Accordingly, the process of, Ser. No. 92,800 of Ben Bluestein entitled "Process for Synthesizing Silanol Chain-Stopped Fluorosiloxane Fluids" covers the process for producing silanol end-stopped fluids within the viscosity of 50 to 2,000,000 centipoise at 25° C. This process comprising taking a cyclopolysiloxane of the formula, $(R R^1 SiO)_3$ 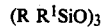 (3)

where R is selected from the class consisting of monovalent hydrocarbon radicals and hydrogen and $R^1$ is a haloalkyl radical such as 3,3,3-trifluoropropyl and adding to it at least 0.01% to 5% by weight of the cyclopolysiloxane of water, and as a promotor from 0.01 to 0.5% by weight of a polyethylene glycol dimethyl ether based on the weight of cyclotrisiloxane and as a catalyst from 0.01 to 0.1% based on the cyclopolysiloxane of an alkyali metal hydroxide such as KOH. The basic polymerization catalyst is preferably an alkali metal hydroxide. The mixture is allowed to react so as to form a silanol end-stopped diorganopolysiloxane polymer of Formula (1). The foregoing process will produce a homopolymer within the scope of Formula (1). If it is desired to produce a copolymer, in addition to the cyclotrisiloxane of Formula (3), there will be present a cyclopolysiloxane of the formula (R R SiO)$_3$ where R is as previously defined. Accordingly, to make a dimethyl copolymer or diphenyl copolymer the appropriate dimethyl cyclotrisiloxane or diphenyltrisiloxane or a mixture of dimethyl and diphenyl cyclosiloxane or other types of siloxanes are reacted with the cyclotrisiloxane disclosed above of Formula (3) so as to form the desired copolymer. Another method of forming the copolymer is to react cyclotetrasiloxane of the desired substituted groups in accordance with disclosure of prior art so as to form the desired copolymers. However, the difficulty with the second process is it involves equilibration and the formation of undesired cyclics in the equilibration mixtures which lowers the yield of the process which is one end result which is desired to be avoided by the process of the instant case. Accordingly, it is highly desireable in the process of the instant case to form a silanol end-stopped fluorosilicone substituted polymer of Formula (1) in accordance with the disclosure set forth herein above. Also by the use of such a chain-stopper as water the cyclic trisiloxane of Formula (3) reacts in a very rapid fashion to form the silanol endstopped fluid of Formula (1) having a viscosity of anywhere from 50 to 2,000,000 centipoise at 25° C. either in the case of formation of a homopolymer or in the case of the formation of a copolymer. Generally such a reaction will take place as rapidly as 15 minutes or a ½ hour. Then the alkali metal hydroxide catalyst, utilized at the concentration of anywhere from 10 to 100 parts per million, is neutralized with a neutralizing agent such as silyl phosphate or other acids so as to terminate the reaction. It should be noted that the process for forming the fluid will take place in as little as 15 minutes to as much as 6 hours. The ingredients can be allowed to react for over 6 hours; however, this is undesireable since the linear polymer that is formed will be degraded to form cyclopolysiloxanes. It should also be noted that it is desired that the reaction period preferably not exceed 6 hours so that a minimum of cyclic polysiloxanes are formed by the degradation of the linear polymer. The reaction temperature is from 25° C. to 100° C.

There is obtained by the process a silanol end-stopped fluid having a viscosity varying from 50 to 2,000,000 centipoise at 25° C. It should be noted that in the production of a homopolymer there is almost no cyclics formed during the reaction, and at the most, there is usually formed 2% cyclics. When it is desired to form copolymer with the present silanol process the amount of cyclics that are formed is in the range of 0.1% to 6% but such percent of cyclics is still less that would be obtained by the prior art equilibration reaction of cyclic trisiloxane with a triorganosiloxy end-stopped chain-stopper.

Once the fluorosilicone polymer of Formula (1) is obtained then there is a simple method for forming the desired end-product of the process of the instant case. Desireably one mole of such fluorosilicone polymer of Formula (1) is mixed with at least 2 moles of the silane of Formula (2). The resulting mixture is allowed to react in the absence of a base to form the desired polymer by a condensation reaction which liberates hydrogen chloride. The reaction can be carried out at anywhere from 0° to 100° C. but is preferably carried out at a temperature of 25° to 75° C. with a most preferred temperature of between 40° and 60° C. The process is also preferably carried out at atmospheric pressure although super atmospheric pressure may be utilized. However, this does not produce any improved results since the reactants react readily at atmospheric pressure. The reaction is allowed to proceed for a period of time for anywhere from ½ hour to 6 hours or most preferably from 1 hour to 2 hours. After the condensation reaction has been initiated, the reaction mixture is heated so as to drive off as much HCl as possible. It can be appreciated it will be HCl which is a condensation product that is formed from the reaction in that reaction mixture. Accordingly, the composition needs to be neutralized. To accomplish this, any mild base may be added to the reaction composition to neutralize the acid. A base such as sodium bicarbonate has been found suitable and even ammonium hydroxide. It has been found that the $Na_2Co_3$ itself may not be added for effective neutralization but there must be added some water to the composition. Accordingly, there is added anywhere from 1 to 2 moles of water per mole of fluorosilicone polymer of Formula (1) in the reaction mixture and sufficient mild base to neutralize the acid in the system. It has been found that the most preferable neutralizing medium is water with sodium carbonate. The amount of water being within the range as indicated previously. One of the reasons sodium carbonate is preferred is that it has been found that it is a very effective neutralization agent in the instant case. It has also been found that the neutralization salt formed precipitates from the fluorosilicone polymer and can be filtered out. There results pure polymer in the neutralized state. The condensation reaction of the instant case proceeds readily without any catalyst and results in a pure triorganosiloxy end-stopped fluorosilicone polymer in a very rapid fashion. By utilizing the process disclosed above in combination with the process for producing the fluorosilicone polymer of Formula (1) there can be obtained a high yield of triorganosiloxy end-stopped fluorosilicone substituted fluid with a viscosity varying from 50 to 2,000,000 centipoise at 25° C. By yield it is meant that from the cyclic trisiloxane that is utilized as the initial reactant there may be obtained as much as 98 percent yield with as little as 2 percent cyclics in the polymer mixture. The small amount of cyclopolysiloxane may remain in the polymer since they may create no problem there. If desired, they can be stripped prior to the compounding of the polymer to form a grease, channel sealant or what have you.

It should be pointed out that the preferred process of the instant case is to form a silanol end-stopped polymer of Formula (1) in accordance with the process disclosed above that is utilized in reacting the silanol chain-stopper with a cyclotrisiloxane to form the polymer of Formula (1) in high yield. Then such a polymer is reacted in a condensation reaction with the chlorosilane of Formula 2 to form the desired fluid. If the process is carried out that is the second part of the process of the instant case which is the reaction of the silane with a compound of Formula (1) wherein the compound of Formula (1) is formed from a different process than the preferred process of the instant case, then the yield of fluid may be lowered since the other process for forming the compound for Formula (1) may not result in high yield of the desired polymer. The reason the preferred process results in a silanol end-stopped fluid of Formula (1) in high yield is that when cyclic trisiloxane is reacted with small amounts of alkali metal hydroxide in the presence of water the mixture reacts almost immediately to form a compound of Formula (1) in high yield, that is with as little as 2 percent cyclics and what as much as 97 to 98 percent of the composition being the compound of Formula (1). It should be noted that the reaction is carefully monitored and is terminated usually after ½ to 5 hours so as little of the polymer of Formula (1) reverts to cyclics as can be helped. Note that this is an important step in the process of the production of the compound of Formula (1) from a cyclic trisiloxane and silanol chain-stopper for Formula (4) since if the reaction is allowed to proceed more of the polymer of Formula (1) would degrade to form cyclics. Accordingly, by utilizing this preferred process, there is formed a compound of Formula 1 in rapid fashion and the high yield polymer of Formula (1) can then be converted to the triorganosiloxy end-stopped polymer by the condensation reaction set forth previously. It should be noted if in the process of forming the polymer of Formula (1) that instead of water there is utilized a triorganosiloxy end-stopped chainstopper, then there will result a much slower reaction with resulting equilibration which results in a much lower yield of the polymer that is desired. The reason for this is that in the equilibration that results, there is formed anywhere from 10 to 40 percent cyclosiloxane which lowers considerably the yield of the desired fluid from the cyclic trisiloxane. Preferably the above process is carried out in two steps, the first step being the preferred process for forming the silanol end-stopped polysiloxane fluid for Formula (1) and the second step being the condensation reaction for adding triorganosiloxy chain-stopping units to the polymer of Formula (1). It should also be noted that when the copolymers are formed, the amount of cyclics that are present are in the same range as in the case of a homopolymer, but the preferred process still results in higher yield of the desired fluid than would be the case with conventional processes.

The Examples below are given for the purpose of illustrating the invention. They are not given for any purpose of setting limits and boundaries for the scope of the instance case or interpretation of the instant case. All parts in the Examples are by weight.

EXAMPLE 1

There was taken 3,800 parts of a silanol end-stopped trifluoropropylmetyhlpolysiloxane having 2.9 percent by weight volatiles and a viscosity of 427 centipoise at 35° C. and the material was put in a flask equipped with a stirrer, addition funnel, thermometer, dry nitrogen, dry ice condenser, and heating bath. The fluid was warmed to about 50° C. and 366 parts of trimethylchlorosilane was added during a two-hour period. Copius amounts of hydrogen chloride were evolved. The mixture was stirred at 50° C. for 2.5 hours and then purged with nitrogen gas for 3 hours. Then 380 parts of soda ash plus 53 parts of water was added and the mixture heated to 68° C. for 4 hours. The mixture was filtered using a pressure filter. The resulting fluid product was neutral and had a viscosity of 279 centipoise at 25° C. and volatiles of 2.5% by weight. An infrared analysis indicated most of the original silanol had reacted. An independent analysis show that the weight ratio of trimethylsiloxy (7) units to methyltrifluoropropyl siloxy (D) units was about 0.078.

EXAMPLE 2

About 4400 parts of silanol stopped trifluoropropylmethylsiloxane having a viscosity of 10,090 centipoise at 25° C. and having 1.8 weight percent votatiles was reacted as in Example 1 with 202 parts of trimethylchlorosilane. The reaction mixture was neutralized by heating at 75° C. for 4.6 hours with 220 parts soda ash plus 240 parts of water. After filtration, the neutral fluid had the viscosity of 8,316 centipoise at 25° C. and volatiles of 2.4 percent by weight. Analysis showed that the monofunctional unit to the difunctional unit ratio was about 0.019.

EXAMPLE 3

Into a reaction flask (equipped with a thermometer, stirrer, condenser, addition funnel) was put 3800 parts methyltrifluoropropylcyclotrisiloxane, 58 parts water, 19 parts of 4% potassium hydroxide in water, 2.4 parts triethyleneglycol dimethylether. The mixture was kept at 35°–40° C. for 6 hours. Then 14 parts trimethylchlorosilane was added to neutralize the base. The resulting silanol-stopped fluid had a viscosity of 427 cs. and a volatiles content of 2.9%. Then 366 parts trimethylchlorosilane was added and the mixture heated at 50° for 2.5 hrs.; $N_2$ purged at 50° C. for 3 hrs.; and neutralized with 380 parts soda ash and 53 parts water at 68° C. for 4 hours. The mixture was filtered. The resulting M-stopped fluid had a viscosity of 279 cs. and volatiles of 2.5% as set forth in Example 1.

In an experiment similar to the above, 800 parts methytrifluoropropylcyclotrisiloxane, 1.9 parts 4% potassuim hydroxide in water, and 0.19 parts triethyleneglycol dimethyl ether resulted in an M-stopped fluid of viscosity 12,900 cs. and 1.8% volatiles.

Although the above fluids were neutralized with soda ash and water another good way of neutralizing the HCl is to add 2.5 parts methyl orthoformate plus 0.5 parts methanol per 100 parts of polysiloxanes, heat the mixture for several hours, and remove the low boiling products by vacuum distillation. Accordingly with this neutralization mixtures it is desireable to have a ratio of from 0.1 to 5 parts by weight of a aliphatic alcohol with about 1 part by weight of methyl orthoformate.

I claim:

1. A method for producing a triorganosily-end stopped diorganopolysiloxane fluid in high yield comprising reacting a polymer of the formula, $$HO\left[\begin{array}{c}R\\|\\Si-O\\|\\R^1\end{array}\right]_x\left[\begin{array}{c}R\\|\\Si-O\\|\\R\end{array}\right]_y H$$

with a chain-terminating silane of the formula, $$R_3{}^2SiX$$

in the absence of a base wherein R is a monovalent hydrocarbon radical of 1 to 8 carbon atoms, $R^1$ is a fluoroalkyl radical of 3 to 8 carbon atoms and $R^2$ is a monovalent hydrocarbon radical of 1 to 8 carbon atoms X is halogen where x is a positive number and y is 0 or a positive number such that the viscosity of said polymer varies from 50 to 2,000,000 centipoise at 25° C. wherein the process is carried out at a temperature in the range of 0° to 100° C. and at atmospheric pressure.

2. The method of claim 1 wherein the process is carried out a temperature in the range of 25° to 75° C. and at atmospheric pressure.

3. The method of claim 1 further comprising after the reaction is complete adding $Na_2CO_3$ and water to the reaction mixture to neutralize said reaction mixture and then filtering out the precipitants to yield the desired product.

4. The method of claim 1 wherein said reaction is carried out for a period of time varying from 1 to 5 hours.

5. The method of claim 1 wherein there is reacted at least 2 moles of said silane per mole of said polymer.

6. The method of claim 1 wherein R is an alkyl radical of 1 to 8 carbon atoms and $R^1$ is 3,3,3 trifluoropropyl.

7. The method of claim 6 wherein R is methyl and the silane is vinyl dimethylchlorosilane.

8. The method of claim 6 wherein R is methyl and the silane is 3,3,3 trifluororpropyl dimethylchlorosilane.

9. The method of claim 6 wherein R is methyl and the silane is phenyldimethylchlorosilane.

10. The method of claim 6 wherein R is methyl and the silane is trimethylchlorosilane.

11. The method of claim 1 wherein R is selected from the class consisting of alkyl radicals of 1 to 8 carbon atoms vinyl and phenyl radicals and where $R^1$ is 3,3,3 trifluorpropyl.

12. A method for producing a fluorosilicone substituted triorganosilyl end-stopped polysiloxane fluid of a viscosity varying from 50 to 2,000,000 centipoise at 23° C. comprising (1) reacting a polymer of the formula, $$HO\left[\begin{array}{c}R\\|\\Si-O\\|\\R^1\end{array}\right]_x\left[\begin{array}{c}R\\|\\SiO\\|\\R\end{array}\right]_y H$$

with a chain terminating silane of the formula, $$R_3{}^2SiX$$

in the absence of a base at a temperature in the range of 0° to 100° C. from 2 to 6 hours at atmospheric pressure where R is an alkyl radical of 1 to 8 carbon atoms, $R^1$ is 3,3,3 trifluoropropyl where x is a positive number and y is a positive number such that the viscosity of the polymer varies from 50 to 2,000,000 centipoise at 25° C. and $R^2$ is methyl; (2) then adding to the reaction mixture $Na_2CO_3$ and water to neutralize the acid; and (3) separating the precipitates to leave the desired liquid product.

13. The method of claim 1 wherein the silanol end-stopped polymer is produced by (1) reacting a cyclopolysiloxane of the formula, $$(R\ R^1SiO)_t$$

where R is selected from the class consisting of alkyl radicals, vinyl radicals, the phenyl radicals and $R^1$ is 3,3,3-trifluoropropyl t is equal to 3 with from 0.01 to 5% by weight of said cyclopolysiloxane of water and a basic polymerization catalyst which is an alkali metal hydroxide wherein there is present as promotor from 0.01 to 0.5% by weight of the cyclopolysiloxane of a polyethylene glycol dimethyl ether wherein the polymerization reaction is carried out at a temperature in the range of 25° to 100° C. and allowing the reaction to proceed and neutralizing the basic polymerization catalyst.

14. The process of claim 13 wherein the polymerization reaction is carried out for a time period varying from 15 minutes to 6 hours.

15. The process of claim 13 wherein the basic polymerization catalyst is neutralized with a silyl phosphate.

16. The process of claim 15 wherein after neutralization of the polymerization mixture, the mixture is heated to a least 150° C. for at least one hour to strip off volatiles.

17. The method of claim 1 further comprising after the reaction is complete adding a mixture of a ratio of 0.1 to 5 parts by weight of methanol with 1 part by weight methyl orthoformate.

18. The method of claim 6 wherein R is methyl and the silane is trimethylchlorosilane.

* * * * *